Oct. 22, 1929.                H. C. WILES                1,732,706
                STOP AND COUNTING MEANS FOR AUTOMATIC MACHINES
                            Filed Jan. 31, 1927
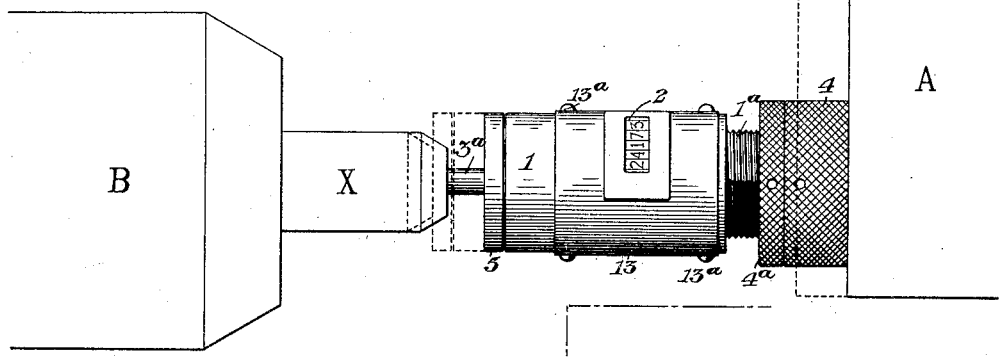
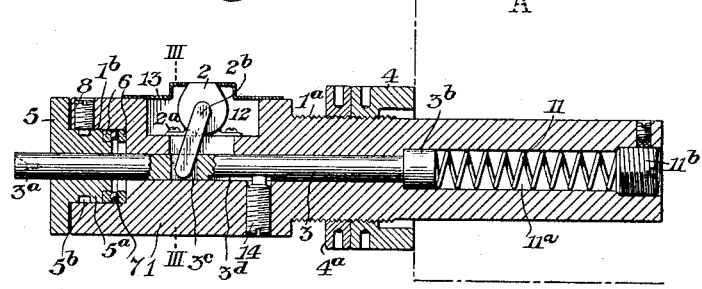
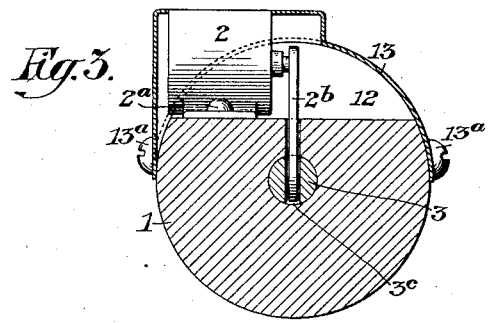
INVENTOR:
Hoyt C. Wiles,
by Murray C. Boyer
Atty.

Patented Oct. 22, 1929

1,732,706

UNITED STATES PATENT OFFICE

HOYT C. WILES, OF FRANKLINVILLE, NEW JERSEY, ASSIGNOR OF ONE-HALF TO PHILIP Y. QUINN, OF COLLINGSWOOD, NEW JERSEY

STOP AND COUNTING MEANS FOR AUTOMATIC MACHINES

Application filed January 31, 1927. Serial No. 164,984.

My invention relates to machines of the automatic screw cutting type, that is to say, machines adapted to receive forgings, castings and pressed metal parts fed from magazines into position to be introduced into a chuck, as well as bar stock of various metals and of various cross sectional contours, which stock may be automatically fed through a suitable holding chuck, for presentation to a turret head having a series of tools which may be successively brought into operative position whereby such parts held by the chuck, or the end of such stock, may be operated upon for finishing purposes or to form various small parts like cap screws or other machine parts, and the like; cutting off means being associated with the other mechanism to remove the finished pieces from the bar stock at regular intervals.

In automatic machines of this type, a stop member is carried by the turret head to regulate the length of the stock projecting through the chuck, or the relation of the part operated upon with respect to such chuck, and one object of my invention is to provide an improved form of stop, having a rotating face or end member engaged by the end of the bar stock or other part operated upon.

A further object of my invention is to combine a counting device with the stop member, with means for operating the same carried by the stop member and brought into action as the stop member moves with the turret head to determine the length of that portion of the bar stock required for the article under manufacture, or the position of the part in the chuck.

And a further object of my invention is to provide means for adjusting the stop member relatively to the turret head carrying the same, so as to provide for the necessary variations in the length of the article being made.

These and other features of my invention are more fully described hereinafter; reference being had to the accompanying drawings, in which:

Fig. 1, is a view in elevation of sufficient of the chuck and turret of an automatic machine to illustrate the features of my invention.

Fig. 2, is a longitudinal sectional elevation of my improved stop and counting device, and Fig. 3, is a cross sectional view on a larger scale, taken on the line III—III, Fig. 2.

In the drawings, A represents the turret head, which carries a series of cutting tools, (not shown) and a stop member, and B, represents a chuck for supporting articles to be operated upon or finished, and through which bar stock, indicated at X, may be fed automatically or otherwise, to position for operation thereon by the tools of the turret head; said chuck being provided with means for automatically opening and closing the same for engagement with a part to be finished or the bar stock, and means being provided to feed the bar stock toward the turret head.

Machines of this type employ a stop member, carried by the turret head, which is automatically brought into axial alignment with the chuck, either for the purpose of pushing into the same a small part from a suitable magazine, or to engage bar stock as the latter is fed through the chuck, to regulate the length of material operated upon relatively to the various cutting members which are brought into contact therewith. In the former practice, this stop has occupied a fixed position with respect to the turret head after adjustment as to length, and by reason of fact that the bar stock or the part to be operated upon is rotating while the stop is at rest it has occurred that the partially or completely finished end of the bar stock or other part, when presented to the stop, has been marred.

One of the problems in connection with present-day machine shop practice has been the counting of the pieces produced by these automatic or semi-automatic machines, and the amount of time required to count the finished pieces, one by one, is out of all proportion to the value of the parts, and adds an item of expense that is hardly warranted.

My improved stop and counting mechanism comprises a stem 1, suitably mounted in the rotatable turret head A; said stem carrying a counting device 2, and a rod 3, slidably mounted, for operating said counting device. The projection of said stem 1 relatively to the face of the turret head and toward the chuck B, may be regulated by an adjustable collar 4, adapted to the threaded portion 1ª, of the stem 1; such collar being held in its adjusted positions by means of a lock nut 4ª.

At the end of the stem I provide a rotating face plate 5, having a hub 5ª, adapted to a socket 1ᵇ, in the end of the stem 1; the inner end of said socket being provided with an anti-friction thrust bearing which may be made up of the plates 6, grooved in the usual manner, with balls 7, interposed between said plates and adapted to said grooves. This rotatable member 5 is held against endwise movement by means of a set screw 8, passing through the wall of the socket 1ᵇ, formed in the end of the stem 1; the inner end of said set screw being reduced and engaging an annular groove 5ᵇ formed in said hub.

Centrally mounted with respect to the stem 1, and slidable therein, is the rod 3, whose end 3ª, is normally projected through the rotatable member 5 at the end of the stem 1; being held in such position by a spring 11, adapted to a socket or recess 11ª, at the rear end of the stem. The rod 3 has an enlarged portion 3ᵇ adapted to the recess receiving the spring, and the latter being retained in place by a screw plug 11ᵇ, fitted into the end of the socket 11ª.

The wall of the stem 1 is recessed at 12 for the reception of the counting device 2, which may be of any well-known type, secured in place by the screws 2ª, and such counting device may be enclosed by a shell 13, secured to the stem 1, by screws 13ª.

This counting device is provided with an operative arm 2ᵇ, and the rod 3, slidable in the stem 1, is provided with a through opening 3ᶜ, for the passage of the end of this arm so that movement of said rod 3, relatively to the stem 1, will actuate said arm 2ᵇ and register a unit on the counting train. The rod 3 is prevented from turning by means of a set screw 14; said rod having a portion of its under surface removed to provide a seat for engagement by the set screw, as indicated at 3ᵈ.

In operation, the turret head A is moved toward and from the chuck B, so that the several tools carried by the turret head (not shown) may be brought into operative engagement with the end of the bar stock or other part operated upon. When operating upon bar stock, the latter is projected through the chuck by suitable means after each finished article has been cut off and the next operation is to measure the projection for the completion of the succeeding piece. The stop member is then brought into alignment with the bar stock by rotating the turret, and then when the turret is moved toward the chuck, the stop engages the end of the bar stock and moves the latter to the limit set by the machine and determined before the work is started, as indicated by dotted lines in Fig. 1. At the same time, the rod 3 will be pressed into the stem 1 against the tension of the spring 11, and in such movement will actuate the arm 2ᵇ of the counting device. When articles are presented by a magazine carrier they may be pushed therefrom into the chuck and positioned for further operation or finishing. In such action the stem 3 will be pushed into the stem 1 to operate the counting device. As the bar stock end as well as the other parts operated upon have finished surfaces, these are not liable to damage by engagement with the stop member since contact will be with the rotatable end or face plate 5 and, if the part is moving, will effect movement of said member 5.

Any desired adjustment of the stem 1, with respect to the turret A, may be effected by the nut 4, which bears against the face of the turret, and may be tightly held in its adjusted positions by the lock nut 4ª.

I claim:

1. The combination with a machine tool having stock feeding means, of a stop member having a shank with a relatively deep socket at its end, a rotatable head in the form of a removable member having a reduced hub fitting the socket at the end of said shank, and means adjustably securing the shank to the machine; said head being apertured for the passage of a plunger slidably mounted therein and projecting into the hollow shank for actuating the arm of counting mechanism mounted on the shank.

2. The combination with a machine tool having automatic stock feeding means, of a stop member comprising a rotatable head and a hollow shank; said shank having a deep socket at its end and said rotatable head having a hub fitting said socket and being apertured for the passage of a plunger slidably mounted therein and extending into the shank for actuating counting and integrating mechanism operatively connected to the plunger, and a ball bearing disposed in the socket of the shank between the same and the hub of said rotatable head.

In witness whereof I have signed this specification.

HOYT C. WILES.